United States Patent
Tiesler

(10) Patent No.: US 6,682,115 B1
(45) Date of Patent: Jan. 27, 2004

(54) STORAGE APPARATUS FOR A VEHICLE PANEL CLOSURE

(75) Inventor: John M. Tiesler, Harrison Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/186,310

(22) Filed: Jun. 28, 2002

(51) Int. Cl.⁷ ............................................... B62D 43/00
(52) U.S. Cl. .................. 296/37.1; 296/37.8; 296/37.12; 224/483
(58) Field of Search ................................ 296/37.1, 37.6, 296/37.8, 37.12, 37.13, 70; 224/483

(56) References Cited

U.S. PATENT DOCUMENTS

| | | | |
|---|---|---|---|
| 2,789,861 A | 4/1957 | Hudson | 296/37.12 |
| 2,887,216 A * | 5/1959 | Hargraves | 224/483 |
| 3,386,765 A | 6/1968 | Drach, Jr. | 296/37.12 |
| 3,503,648 A | 3/1970 | James | 296/37.12 |
| 4,099,814 A | 7/1978 | Hasselberger | 312/317 R |
| 4,693,382 A | 9/1987 | Galen | 211/189 |
| 5,009,458 A * | 4/1991 | Shute | 296/37.13 |
| D328,730 S | 8/1992 | Kapp | D12/155 |
| 5,261,716 A * | 11/1993 | Phelps | 296/37.13 |
| 5,413,265 A | 5/1995 | Stahl et al. | 226/188 |
| 5,499,853 A * | 3/1996 | Pourian | 296/37.13 |
| 5,685,470 A | 11/1997 | Moore | 224/567 |
| 5,795,005 A * | 8/1998 | Garfias et al. | 296/37.13 |
| 5,915,776 A | 6/1999 | Bieri | 296/37.12 |
| D419,521 S | 1/2000 | Leschke et al. | D12/425 |
| 6,106,085 A | 8/2000 | Berrito et al. | 312/351 |
| 6,109,493 A | 8/2000 | Bieri | 224/483 |
| 6,120,077 A * | 9/2000 | Westphal et al. | 296/37.13 |
| 6,231,099 B1 | 5/2001 | Greenwald | 296/37.8 |
| 6,471,276 B1 * | 10/2002 | Brunsman et al. | 296/37.13 |

FOREIGN PATENT DOCUMENTS

| | | | | |
|---|---|---|---|---|
| DE | 3510405 A1 * | 9/1986 | | 296/37.12 |
| JP | 1-186444 | 7/1989 | | |
| JP | 406156149 A * | 6/1994 | | 296/37.12 |

* cited by examiner

Primary Examiner—Joseph D. Pape
Assistant Examiner—Lori L Coletta
(74) Attorney, Agent, or Firm—Bill C. Panagos

(57) ABSTRACT

A storage apparatus for mounting to a closure for an opening in a vehicle trim panel includes an expandable wall adapted to be mounted on the closure, wherein the expandable wall and the closure define a pocket for containing an object between the expandable wall and the closure.

8 Claims, 3 Drawing Sheets

STORAGE APPARATUS FOR A VEHICLE PANEL CLOSURE

TECHNICAL FIELD

This invention relates to a closure for an opening in an interior vehicle panel. More particularly, the invention relates to a closure for an opening in an interior vehicle panel having a storage apparatus mounted to a surface thereof.

BACKGROUND OF THE INVENTION

Vehicle interiors typically include a variety of decorative and functional trim panels. For example, the front area of the interior of a vehicle, generally referred to as the cockpit area, includes an instrument panel, typically formed of a molded plastic material. The instrument panel typically includes an opening known as a glove compartment or glove box. Typically, the glove box includes a closure. The glove box closure may be mounted to the instrument panel by any desired means. Preferably, a hinge is used to mount the glove box closure to the instrument panel, however a hinge need not be used. For example, the glove box closure may be slidably mounted within the glove box.

Vehicle occupants often store items in the glove box for periodic retrieval. Such items are known to move within the glove box when the vehicle is in motion, and therefore are difficult to locate. Additionally, such items are known to fall from the glove box when the glove box closure is opened or removed. The items stored within the glove box can be susceptible to damage as a result of such movement or falling.

It would be advantageous if there could be developed a closure for an opening in an interior vehicle panel, where items stored within the opening may be securely retained.

SUMMARY OF THE INVENTION

This invention relates to a storage apparatus for mounting to a closure for an opening in a vehicle trim panel. The storage apparatus includes an expandable wall adapted to be mounted on the closure, wherein the expandable wall and the closure define a pocket for containing an object between the expandable wall and the closure.

In one embodiment of the invention, the expandable wall includes a mounting frame and an expandable wall portion. The mounting frame is substantially C-shaped and has a closed end and an open end. An elastic band is mounted to the open end of the mounting frame. A portion of the expandable wall is formed of net. The expandable wall is adapted to be selectively mounted and dismounted relative to the closure.

In another embodiment of the invention, a portion of the expandable wall includes a pleat.

In another embodiment of the invention, the expandable wall is formed of expandable fabric.

Various objects and advantages of this invention will become apparent to those skilled in the art from the following detailed description of the preferred embodiment, when read in light of the accompanying drawings.

DETAILED DESCRIPTION OF THE INVENTION

Figure 1:
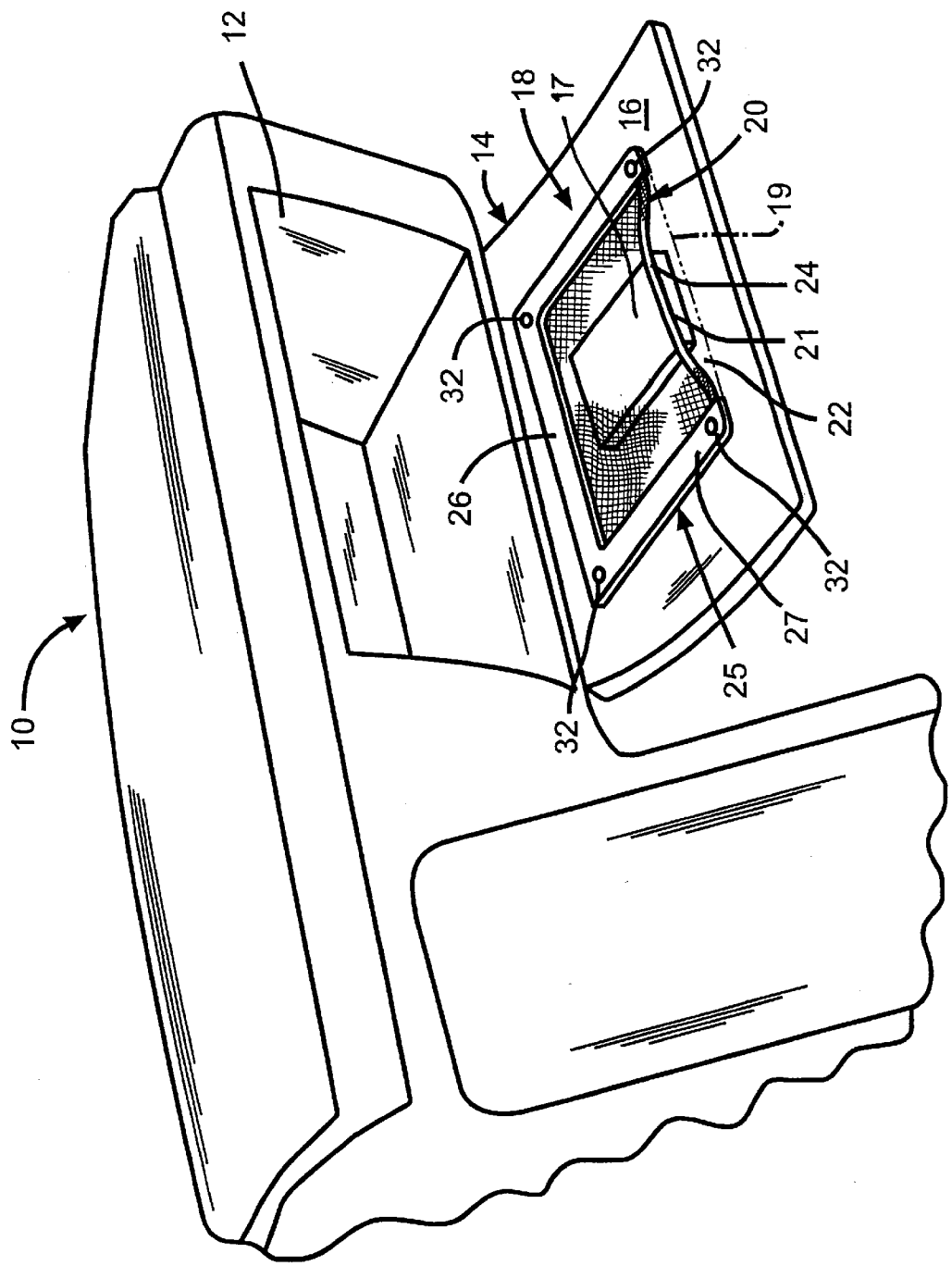
FIG. 1 is a perspective view of a vehicle instrument panel illustrating an instrument panel closure and a storage apparatus according to the invention showing an object contained between storage apparatus and the closure.

As shown in FIG. 1, there is generally shown at 10 an instrument panel for a vehicle. The instrument panel 10 is positioned inside the body of a vehicle (not shown) at a forward portion of the vehicle commonly referred to as the cockpit. The instrument panel 10 generally extends across the width of the interior of the vehicle. The instrument panel 10 includes a plurality of openings (not shown) suitable for permitting the integration of different accessories and/or internal components of the vehicle, such as openings for integrating a steering column (not shown), an instrument housing (not shown), a radio (not shown), and a glove box 12. The glove box 12 typically includes a glove box closure 14 for containing objects within the glove box 12. The glove box closure 14 typically includes a closure body having an interior or cockpit facing surface (not shown) and an inwardly facing surface 16.

Figure 2:
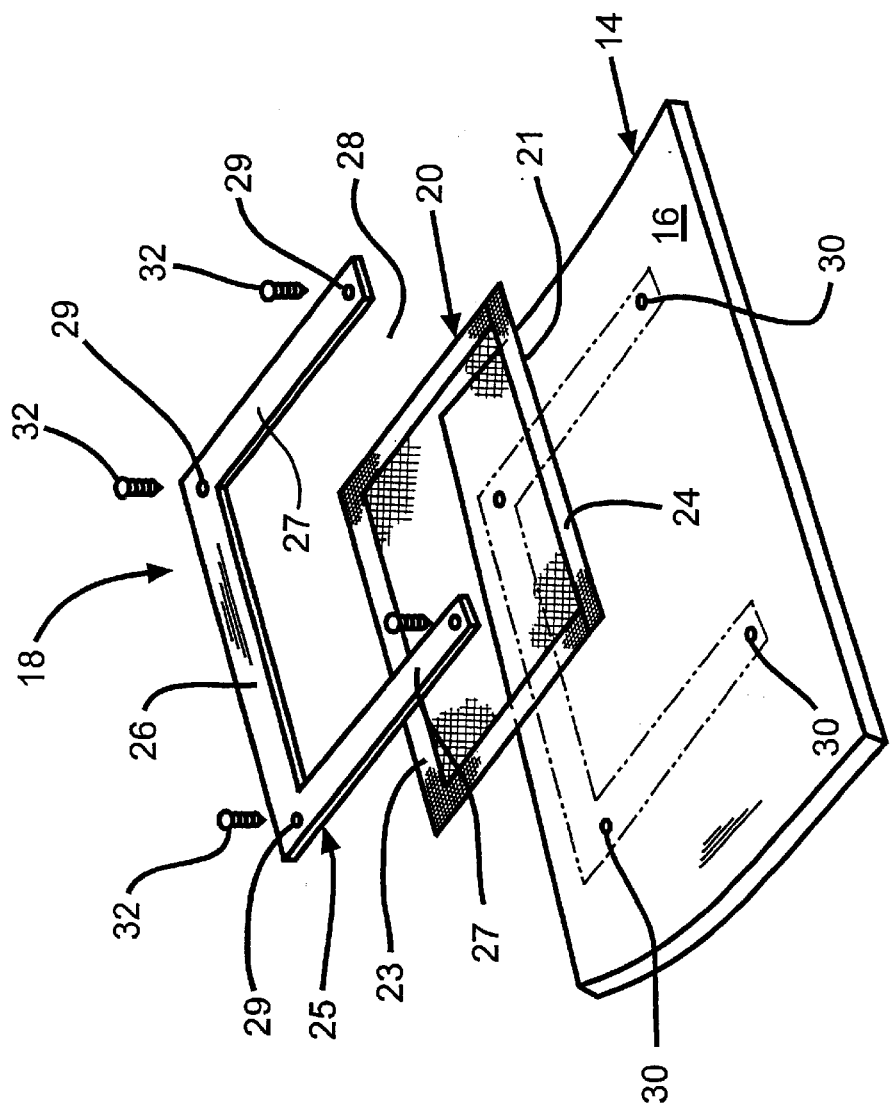
FIG. 2 is an enlarged exploded perspective view of the storage apparatus illustrated in FIG. 1.

Referring now to FIGS. 1 and 2, a first embodiment of a storage apparatus according to the invention is illustrated generally at 18. The storage apparatus includes an expandable wall 20. The expandable wall 20 includes a leading edge 21. It will be understood that as used herein, an expandable wall is defined as a wall movable between a closed position wherein the wall is generally adjacent the closure surface 16, as shown by phantom line 19 in FIG. 1, and an expanded position wherein the wall is spaced from the closure body to define a pocket 22 or storage compartment for containing one or more objects 17. The expandable wall 20 may be formed from any desired flexible material, such as expandable fabric. Polyester net, such as TC13 net material manufactured by APEX Mills, is a preferred material for the expandable wall 20 because of its strength, flexibility, and relative transparency. The wall 20 can also be formed from any desired material. In the illustrated embodiment, the expandable wall 20 is a net, although a net is not required.

The expandable wall 20 preferably includes a hem 23 suitably attached to one or more peripheral edges of the wall 20. It will be understood that as used herein, a hem is a border of material, such as a cloth article, doubled back and fastened, such as by stitching. The hem 23 provides increased rigidity to the peripheral edges of the wall 20, and substantially eliminates fraying of the wall material. Polyester or nylon fabrics are preferred materials for the hem 23 because they are lightweight, durable, and are easily stitched together. The hem 23 can also be formed from any desired material.

The expandable wall 20 preferably also includes an elastic band 24 suitably attached to the leading edge 21. The elastic band 24 provides resilience to the leading edge 21 of the wall 20 so that an object may be securely contained in the pocket 22. The elastic band 24 may further substantially eliminate fraying of the wall material at the leading edge 21. A strip or band of elastic material is preferred for the elastic band 24 because of its ability to be easily stretched or expanded and to thereafter resume its former shape. The elastic band 24 can also be formed from any desired material.

A generally U-shaped bezel or frame 25 is preferably used to attach the wall 20 to the surface 16 of the closure 14. The frame 25 can be formed from any desired material. Plastic is a preferred material for the frame 25 because of its light weight, rigidity and strength. The frame 25 is preferably generally U-shaped and includes a closed end 26, and two arms 27 which define an open end 28 therebetween. The frame 25 may also be formed in any desired shape. The frame 25 can be attached to the closure 14 by any desired means. A push-fit, or snap-in clip fastener 32, such as by a Christmas tree type fastener is preferred because of its ability to be easily and quickly inserted and removed. A Christmas tree type fastener is well known in the art, and provides a series of resilient fins capable of different levels of axial retention and grip ability. A Christmas tree type fastener typically includes fins which flex inward during application and retract outward once inserted, thereby creating an axial force which holds respective members, e.g. the frame 25 and the closure 14, together. Any other desired fastener 32 may also be used.

Preferably, a plurality of fasteners 32 are inserted through fastener apertures 29 in the frame 25, through a portion of the wall 20, then into corresponding fastener receiving apertures 30 in the closure 14. The fasteners 32 may be inserted through a normally occurring opening in the net material of the wall 20, or may be inserted through an opening (not shown) formed in the hem 23.

In the illustrated embodiment, the frame 25 is attached to the closure 14 by a plurality of fasteners 32, although such an arrangement is not required. For example, the frame 25 may be integrally formed in the surface 16 of the closure 14, or attached with a suitable adhesive. Alternately, the frame 25 may be welded, such as by sonic welding, to the closure 14. In either case, the wall 20 would be inserted between the frame 25 and the closure 14, and attached to the closure 14 with fasteners 32 as described above. It will be understood that the elastic band 24 may also be mounted at the open end 28 of the frame 25 between the arms 27.

The expandable wall 20, frame 25, and fasteners 32 have been illustrated in the context of being assembled to the glove box closure 14. However, it will be understood that the expandable wall 20, frame 25, and fasteners 32 can be pre-assembled to form a sub-assembly, and then attached to any desired surface. It will also be understood that the sub-assembly formed by the expandable wall 20, frame 25, and fasteners 32 can be selectively mounted and dismounted relative to the glove box closure, or selectively mounted and dismounted relative to any desired surface.

Figure 3:
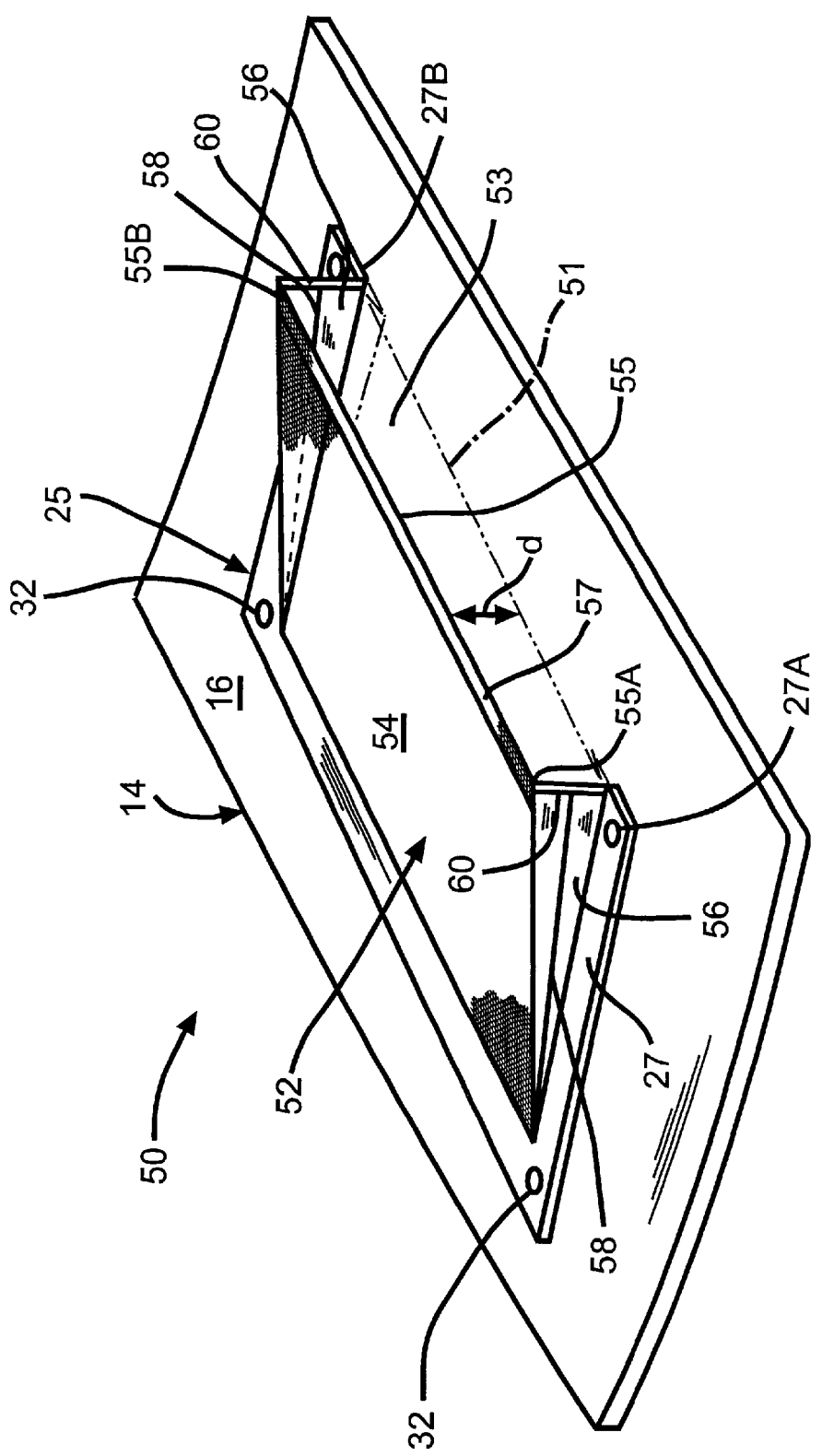
FIG. 3 is a perspective view of an alternate embodiment of a storage apparatus according to the invention.

An additional embodiment of the storage apparatus according to the invention is illustrated generally at 50 in FIG. 3. The storage apparatus 50 is substantially identical to the storage apparatus 18, and includes the frame 25, and fasteners 32. However, the storage apparatus 50 includes an expandable wall 52. The expandable wall 52 includes a first wall portion 54, and at least one second wall portion 56. The first wall portion 54 includes a leading edge 55. The first wall portion may include a hem 57 suitably attached to the leading edge 55, although the hem 57 is not required. Preferably, the hem 57 is formed of the same material as the first wall portion 54. The hem 57 can also be formed of any desired material.

The expandable wall 52 is also movable between a closed position and an open position. The closed position is defined wherein the first wall portion 54 is generally adjacent the closure surface 16, as shown by phantom line 51 in FIG. 3. The expanded position is defined wherein the first wall portion 54 is spaced apart a distance d from the closure surface 16 to define a pocket 53 for containing an object. The expandable wall 52 can be formed from any desired material. Expandable or flexible fabric is a preferred material for the expandable wall 52. The wall 52 can also be formed from any desired material, including generally rigid materials, such as plastic.

The second wall portion 56 also preferably includes at least one pleat 58. As used herein, a pleat is a fold in a sheet of material, such as the second wall portion 56, formed by doubling the sheet of material over on itself. In the illustrated embodiment, the expandable wall 52 includes two second wall portions 56, each having a pleat 58, although such an arrangement is not required. For example, the wall 52 can include only one second wall portion 56, or more than two second wall portions 56. The wall portions 56 can include more than one pleat 58. Additionally, the first wall portion 54 can also include a pleat.

The expandable wall 52 preferably also includes elastic bands 60 suitably attached to opposite ends 55A and 55B of the leading edge 55, and suitably attached to the frame 25, such as at ends 27A and 27B of the arms 27. The elastic bands 60 provide resilience to the leading edge 55 of the first wall portion 54 so that objects may be securely contained in the pocket 53. A strip or band of elastic material is preferred for the elastic bands 60 because of the its aforementioned ability to be easily stretched or expanded and to thereafter resume its former shape. The elastic bands 60 can also be formed from any desired material. In the illustrated embodiment, the storage apparatus 50 includes two elastic bands 60, although such is not required. For example, one elastic band (not shown) can be attached to the arm ends 27A, leading edge ends 55A and 55B, and arm end 27B.

In the illustrated embodiment, the surface 16 is a surface of a glove box closure 14, although such is not required. For example, the storage apparatus of the invention may be mounted to any desired surface.

The principle and mode of operation of this invention have been described in its preferred embodiments. However, it should be noted that this invention may be practiced otherwise than as specifically illustrated and described without departing from its scope.

What is claimed is:

1. A storage apparatus for an opening in a vehicle trim panel, said storage apparatus comprising:

a closure moveably mounted relative to a vehicle trim panel for obtaining access to an opening in the trim panel; and an expandable wall including a net and a substantially C-shaped mounting frame defining an open end, wherein said mounting frame is attached to said closure such that said net is disposed between said mounting frame and said closure for securing a portion of an outer periphery of said net to said closure, wherein said net and said closure define a pocket for containing an object between said net and said closure.

2. The storage apparatus according to claim 1 further including an elastic band positioned at said open end of said mounting frame.

3. The storage apparatus according to claim 1, wherein said expandable wall is adapted to be selectively mounted and dismounted relative to said closure.

4. The storage apparatus according to claim 1, wherein said net is formed of expandable fabric.

5. The storage apparatus of claim 2 including a hem attached to the peripheral edge of the net.

6. The storage apparatus of claim 1 including a hem attached to the peripheral edge of the net.

7. The storage apparatus of claim 1, wherein said mounting frame is attached to said closure by a plurality of fasteners, and wherein said fasteners extend through said net.

8. The storage apparatus of claim 7 including a hem attached to a peripheral edge of said net, wherein said fasteners extend through said hem.

* * * * *